United States Patent
Rhee et al.

(10) Patent No.: US 10,257,529 B2
(45) Date of Patent: Apr. 9, 2019

(54) TECHNIQUES FOR GENERATING WAVE FRONT GROUPS FOR PARALLEL PROCESSING A VIDEO FRAME BY A VIDEO ENCODER

(71) Applicant: INTEL CORPORATION, Santa Clara, CA (US)

(72) Inventors: Changwon D. Rhee, Rocklin, CA (US); Kin-Hang Cheung, San Jose, CA (US); Sang-Hee Lee, Santa Clara, CA (US); Zhijun Lei, Portland, OR (US); Dmitry E. Ryzhov, Moscow (RU); Xinglei Zhu, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 513 days.

(21) Appl. No.: 14/319,437

(22) Filed: Jun. 30, 2014

(65) Prior Publication Data

US 2015/0382021 A1 Dec. 31, 2015

(51) Int. Cl.
*H04N 19/176* (2014.01)
*H04N 19/436* (2014.01)

(52) U.S. Cl.
CPC ................................. *H04N 19/436* (2014.11)

(58) Field of Classification Search
CPC .................................................... H04N 19/436
See application file for complete search history.

(56) References Cited

U.S. PATENT DOCUMENTS

| | | |
|---|---|---|
| 2013/0114735 A1 | 5/2013 | Wang |
| 2013/0114736 A1* | 5/2013 | Wang ................... H04N 19/176 375/240.24 |
| 2013/0182775 A1 | 7/2013 | Wang et al. |
| 2014/0003532 A1 | 1/2014 | Coban et al. |
| 2014/0241439 A1 | 8/2014 | Samuelsson et al. |
| 2015/0172688 A1 | 6/2015 | Maeda et al. |

FOREIGN PATENT DOCUMENTS

JP 2015526969 A 9/2015

OTHER PUBLICATIONS

Sun et al., "A Highly Efficient Parallel Algorithm for H.264 Encoder Based on Macro-Block Region Partition", Computer School, National University of Defense Technology, Changsha, China, R. Perrott et al. (Eds.): HPCC 2007, LNCS 4782, pp. 577-585, 2007. © Springer-Verlag Berlin Heidelberg 2007.*

(Continued)

*Primary Examiner* — Dave Czekaj
*Assistant Examiner* — Alison Slater

(57) ABSTRACT

Various embodiments are generally directed to an apparatus, method and other techniques for dividing a frame comprising pixels into a number of macroblocks, each macroblock comprising a number of pixels within four macroblock boundaries. Various embodiments may also include creating at least two regions having a plurality of macroblocks by dividing the frame along macroblock boundaries and generating wave front groups based on the macroblocks in each region, each wave front group from each region comprising one or more macroblocks to process in parallel.

19 Claims, 16 Drawing Sheets

(56) References Cited

OTHER PUBLICATIONS

Seitner et al. "Evaluation of data-parallel H.264 decoding approaches for strongly resource-restricted architectures" Published online: Mar. 21, 2010 © Springer Science+Business Media, LLC 2010.*
International Search Report and Written Opinion received for PCT Patent Application No. PCT/2015/031296, dated Aug. 20, 2015, 11 pages.
Seitner et al., "Evaluation of data-parallel splitting approaches for H. 264 decoding", Proceedings of the 6th International Conference on Advances in Mobile Computing and Multimedia (MoMM), Nov. 24, 2008, 20 pages.
Office Action received for Japanese patent Application No. 2016-568051, dated Nov. 28, 2017, 3 pages English translation.
Zhoa et al., "AHG8 Comments on HEVC Version 1 Profile and Level definition", JCT-VC of ITU-T SG16 WP3, JCTVC-Ho353, Feb. 1-10, 2012, 4 pages.
Misra et al., "AHG4: Entry point signaling for wavefront substreams within tiles", JCT-VC Meeting 101, 2012, 3 pages.
Coban et al., "AHG4: On tiles and wavefront parallel processing", JCT-VC Meeting 101, 2012, 6 pages.
Chen et al., "Implementation of H.264 encoder and decoder on personal computers", J. of Visual Communication and Image Representat, Apr. 1, 2006, 24 pages.
Minhua Zhou, Texas Instruments inc., x [online], JCTVC-J JCTVC-J0088, URL:http://phenix.itsudparis.eu/jct/doc_end_user/documents/10_Stockholm/wg11/JCTVC-J0088-v2.zip.
Sun, Shuwei Chen, Shuming. (2008). An Efficient Parallel Algorithm for H.264/AVC Encoder. Tien Tzu Hsueh Pao/Acta Electronica Sinica. 37. 66-69. 10.1109/PDCAT.2008.19. Computer School. National University of Defense Technology.

* cited by examiner

| | 202-1 | 202-2 | 202-3 | 202-4 | 202-5 | 202-6 | 202-7 | 202-8 | 202-9 | 202-10 |
|---|---|---|---|---|---|---|---|---|---|---|
| 204-1 | 0<br>206-1 | 1<br>206-2 | 2 | 3<br>206-4 | 4 | 5 | 6 | 7 | 8 | 9 |
| 204-2 | 2<br>206-3 | 3<br>206-4 | 4 | 5 | 6 | 7 | 8 | 9 | 10 | 11 |
| 204-3 | 4 | 5 | 6 | 7 | 8 | 9 | 10 | 11 | 12 | 13 |
| 204-4 | 6 | 7 | 8 | 9 | 10 | 11 | 12 | 13 | 14 | 15 |
| 204-5 | 8 | 9 | 10 | 11 | 12 | 13 | 14 | 15 | 16 | 17 |
| 204-6 | 10 | 11 | 12 | 13 | 14 | 15 | 16 | 17 | 18 | 19 |

| | 202-1 | 202-2 | 202-3 | 202-4 | 202-5 | 202-6 | 202-7 | 202-8 | 202-9 | 202-10 |
|---|---|---|---|---|---|---|---|---|---|---|
| 204-1 | 0<br>206-1 | 1<br>206-2 | 2<br>206-3 | 3<br>206-4 | 4 | 5 | 6 | 7 | 8 | 9 |
| 204-2 | 2<br>206-3 | 3<br>206-4 | 4 | 5 | 6 | 7 | 8 | 9 | 10 | 11 |
| 204-3 | 4 | 5 | 6 | 7 | 8 | 9 | 10 | 11 | 12 | 13 |
| 204-4 | 0<br>206-1 | 1<br>206-2 | 2<br>206-3 | 3<br>206-4 | 4 | 5 | 6 | 7 | 8 | 9 |
| 204-5 | 2<br>206-3 | 3<br>206-4 | 4 | 5 | 6 | 7 | 8 | 9 | 10 | 11 |
| 204-6 | 4 | 5 | 6 | 7 | 8 | 9 | 10 | 11 | 12 | 13 |

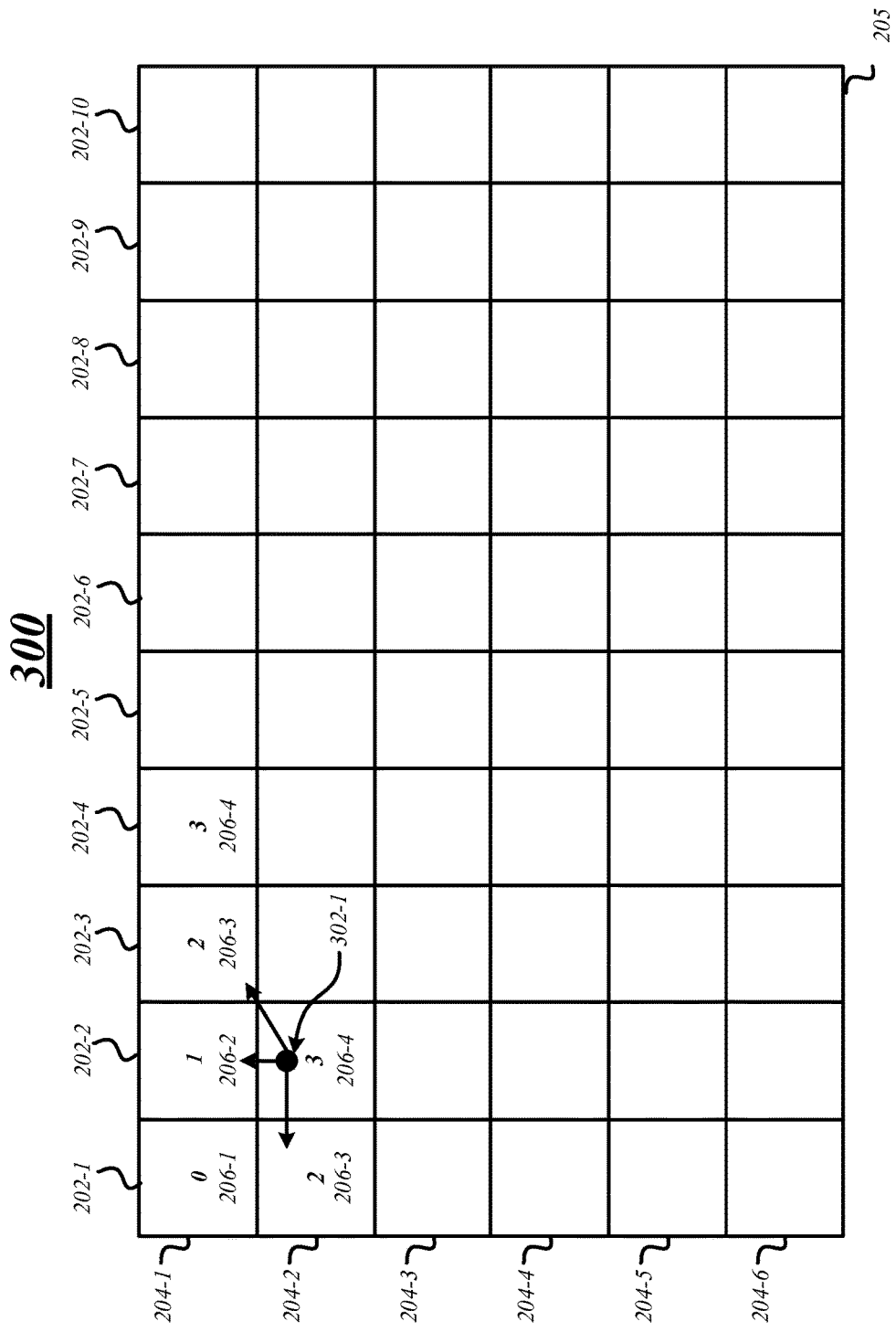

350

| # of Regions | Frame Size | Width in MB | Height in MB | Horizontal Wavefront groups | Diagonal Wavefront groups |
|---|---|---|---|---|---|
| 2 | 1280x720 | 80 | 45 | 124 | 84 |
| 2 | 1920x1080 | 120 | 68 | 186 | 127 |
| 2 | 3840x2160 | 240 | 135 | 374 | 254 |
| 4 | 1280x720 | 80 | 45 | 102 | 42 |
| 4 | 1920x1080 | 120 | 68 | 152 | 64 |
| 4 | 3840x2160 | 240 | 135 | 306 | 127 |
| 8 | 1280x720 | 80 | 45 | 90 | 21 |
| 8 | 1920x1080 | 120 | 68 | 135 | 32 |
| 8 | 3840x2160 | 240 | 135 | 272 | 64 |

DIVIDE A VIDEO FRAME COMPRISING PIXELS INTO A NUMBER OF MACROBLOCKS, EACH MACROBLOCK COMPRISING A NUMBER OF PIXELS WITHIN FOUR MACROBLOCK BOUNDARIES
605

CREATE AT LEAST TWO REGIONS HAVING A PLURALITY OF MACROBLOCKS BY DIVIDING THE VIDEO FRAME ALONG MACROBLOCK BOUNDARIES
610

GENERATE WAVE FRONT GROUPS BASED ON THE MACROBLOCKS IN EACH REGION, EACH WAVE FRONT GROUP COMPRISING ONE OR MORE MACROBLOCKS TO PROCESS IN PARALLEL
615

*FIG. 6*

TECHNIQUES FOR GENERATING WAVE FRONT GROUPS FOR PARALLEL PROCESSING A VIDEO FRAME BY A VIDEO ENCODER

TECHNICAL FIELD

Embodiments described herein generally relate to techniques for processing a raw video stream. More specifically, techniques may include encoding one or more video frames of the raw video stream.

BACKGROUND

Full-motion video displays based upon analog video signals have long been available in the form of television. With recent advances in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video includes large numbers of frames that are played or rendered successively. Each frame is a still image formed from an array of pixels based on the display resolution of a particular system. Typically, the amount of raw digital information in video is massive, takes up a large amount of storage, and uses a significant amount of bandwidth when being transmitted.

To address the limitations in storing or transmitting such massive amounts of digital video information, various video compression standards or processes have been established. In some instances, video encoders are used to take the video data and to encode it in a format which takes up less space. As a result, the bandwidth consumed between devices that transmit and receive the video information may be used more efficiently or more data can be transmitted between those devices in the same time.

BRIEF DESCRIPTION OF THE DRAWINGS

FIGS. 2A-2E illustrate exemplary embodiments of video frames.

FIGS. 3A-3C illustrate exemplary embodiments of video frames with macroblock dependencies.

FIG. 3D illustrates an exemplary embodiment of a table of wave front groups.

FIG. 6 illustrates an exemplary embodiment of a second logic flow diagram.

DETAILED DESCRIPTION

Figure 1A:
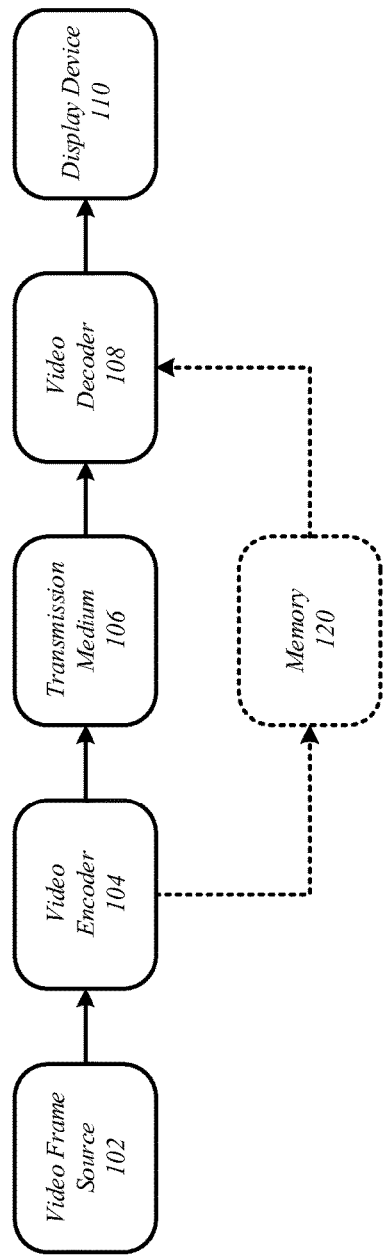
FIG. 1A illustrates an exemplary embodiment of a video frame processing system.

Various embodiments are generally directed to an apparatus, system and method for encoding one or more video frames of a raw video stream. The video frames may be encoded based on any encoding standard such as the International ITU-T International Organization for Standardization (ISO) video compression standard known as ITU-T/ISO H.264 or as advanced video codec (AVC) and MPEG-4 Part 10. The video frames may be processed according to the High Efficiency Video Coding (HEVC) video compression standard, a successor to H.264/MPEG-4 AVC (Advanced Video Coding) that was jointly developed by the ISO/IEC Moving Picture Experts Group (MPEG) and ITU-T Video Coding Experts Group (VCEG) as ISO/IEC 23008-2 MPEG-H Part 2 and ITU-T H.265. Various embodiments are not limited to these standards and the video frames may be processed according to any other standard such as VP8 and VP9, open and royalty free video compression standards being developed by Google®.

Further, one or more embodiments may be directed to dividing frames into a number of macroblocks based on the encoding standard and then into a number of regions each having one or more macroblocks. Each macroblock may be a 16×16 matrix of pixels or any size based on the video compression standard used for encoding. The macroblocks may have four macroblock boundaries or sides that are defined by a column or a row of pixels. The macroblock boundaries may be used to divide the video frame along to generate two or more regions.

For example, a video frame may be divided horizontally or diagonally along the macroblock boundaries or edges of macroblocks. In various embodiments, the macroblocks may be assigned to one or more wave front groups and processed in parallel or approximately at the same. In other words, all of the macroblocks assigned to the same wave front group may be processed in parallel. By processing the macroblocks in parallel significant performance gains may be achieved including reducing the number of processing cycles to process a video frame. As will become apparent by the following description, when the video frames are divided into a number of regions along a macroblock boundaries the number of macroblocks that may be processed in parallel increases and the number of processing cycles is significantly reduced.

Various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an embodiment of a video frame processing system 100 to process information and data. In particular, video frame processing system 100 may be used to encode and decode a video frame. The video frame processing system 100, however, is not intended to suggest any limitation as to scope of use or functionality, as the techniques and tools may be implemented in diverse general-purpose or special-purpose computing environments. Accordingly, video frame processing system 100 may include a video source 102, a video frame encoder 104, a transmission medium 106, a video frame decoder 108, and a display 110. In some embodiments, the video frame processing system 100 may include memory 120. In some embodiments, the video frame processing system 100 may include a video encoder/decoder processing system according to one or more standards as previously discussed, such as HVEC, H.265, VP8 and VP9.

The original, full information content video signal, e.g., in analog format, may be provided to the video frame source 102. The video frame source 102 may perform various functions such as, digitization of the video signal into a luminance (luma) and chrominance (chroma) format, e.g., YCbCr, YUV, YIQ, and YCC family of color spaces. Those skilled in the art will appreciate that for the YCbCr color space Y is the luma component and Cb and Cr are the chroma components; for the YUV color space Y is the luma component and U and V are the chroma components; for the YIQ color space Y is the luma component and I and Q are the respective in-phase and quadrature chroma components; and for the YCC color space Y is the luma component and C (Cb) and C (Cr) are the chroma components.

The video frame source 102 may provide the formatted digitized video signals to the video encoder 104. Regardless of the particular video format, the video frame source 102 may perform the necessary processing to supply a full-information digital video signal version of the original analog video signal to the video encoder 104. In various embodiments, the video frame source 102 may be a transmission medium or a stored file. The video frame source 102 may provide the digital video signal sequences in the form of pictures or video frames to the video encoder 104.

The architecture and the core building blocks of the video encoder 104 may be based on motion-compensated transform coding and may perform various motion vector and mode computations. For example, each video frame may be compressed by partitioning it as one or more regions, where each region may include one or more macroblocks. In some embodiments, the macroblocks may be defined as blocks of 16×16 luma pixels (or samples) with corresponding chroma samples. Each macroblock also may be divided into one or more sub-macroblock partitions for motion-compensated prediction. In the same or other embodiments, the macroblocks may be a different size, such as a 4×4 macroblock, an 8×8 macroblock, a 32×32 macroblock and so forth and may be based on the standard used for encoding.

The video encoder 104 may receive a digital video signal sequence from the video frame source 102 in the form of one or more video frames. The video encoder 104 compresses the video frames and passes compressed video bits in the form of a bitstream to the transmission medium 106 and/or the memory 120. In some embodiment, the compression may be performed in accordance with one of the standards specified above and the output bitstream may be a bitstream based on the standard used for compression.

The video encoder 104 receives the frames for encoding. As will be discussed in more detail below, the frames are processed in units of a macroblock corresponding to blocks of 16×16 pixels in the original image, or any other sized pixel matrix. Each macroblock may be assigned or put into a wave front group based on one or more macroblock dependencies. Each macroblock in a wave front group may be encoded or processed in parallel. For example, all the macroblocks belonging to a first wave front group may be processed in parallel to find the motion vectors and modes, and then all the macroblocks belonging to a second wave front group may be processed in parallel, and so on until all the macroblocks are encoded.

In some embodiments, the encoding of a macroblock may depend on the encoding of neighboring macroblock creating macroblock dependencies. For example, in some embodiments, a macroblock may depend on the macroblock to the left, top and top-right. Thus, the macroblocks to the left, top and to the top-right may be processed before the dependent macroblock is encoded. However, various embodiments are not limited in this manner and as will be explained in more detail below with respect to FIG. 3A-3C, predicted macroblocks may be used.

In some embodiments, a predicted macroblock may be formed based on a reconstructed frame. For example, the predicted macroblock may be formed from samples in a current frame that were previously encoded, decoded, and reconstructed. In another example, the predicted macroblock may be formed by motion-compensated prediction from one or multiple reference frames. The predicted macroblock is subtracted from the current macroblock to produce a residual or difference macroblock. Using a block transform, the residual or difference macroblock is transformed and quantized to provide a set of encoded coefficients in addition to other information required to decode the macroblock and to form a compensated bitstream. The other information may include, e.g., macroblock predicted mode, quantizer step size, motion vector information describing how the macroblock was motion-compensated, among others. The compensated bitstream may be passed to the storage/transmission medium 106 for transmission.

The transmission medium 106 may provide a medium by which the encoded video signal eventually may be supplied to the video decoder 108. For example, the transmission medium 106 may be a digital communication system including one or more wired or wireless connections. Alternatively or simultaneously, the compensated bitstream may be sent to memory 120 which may be implemented using any machine-readable or computer-readable media capable of storing data, including both volatile and non-volatile memory. In some embodiments, the machine-readable or computer-readable medium may include a non-transitory medium. The embodiments are not limited in this context. In some embodiments, the memory 120 may be provided for temporary storage of video frame information, for example. In addition, the transmission medium 106 and/or the memory 120 may store data in buffers.

The video decoder 108 receives an encoded/compressed digital video signal in the form of a bitstream including the compressed video bits from the transmission medium 106 and/or the memory 120 and decodes it to produce a decoded video signal that may be supplied to the display device 110. In some embodiments, the encoded/compressed video signal may be in the form based on one of the standard specification, such as H.264, HEVC, H.265, V8, V9 and so forth, as previously discussed. Generally, the video decoder 108 conceptually works in reverse to the video encoder 104 and may include primarily an entropy decoder among various other processing elements. The video signal produced by the video decoder 108 may be identical to the signal supplied to the video encoder 104 if the video encoder 104 employs a lossless encoding method. The video signal produced by the video decoder 108 may differ somewhat from the signal supplied to the video encoder 104 if the video encoder 104 employs a lossy encoding method, e.g., an MPEG-like encoding method.

In various embodiments, the display device 110 may be any type of display device for display information received from the video decoder 108. The display device 110 may include at least one of a Liquid Crystal Display (LCD), a Thin Film Transistor-LCD (TFT-LCD), an Organic Light Emitting Diode (OLED), a flexible display, a three-dimensional (3D) display and a projector, for example. In addition to display the video frame and video information, the display device 110 may display a User interface (UI) or a Graphical User Interface (GUI) associated with controlling functionality of the video frame processing system 100. In some embodiments, the video frame processing system 100 may include two or more display units. For example, in one embodiment, the video frame processing system 100 may include two LCD displays.

Figure 1B:
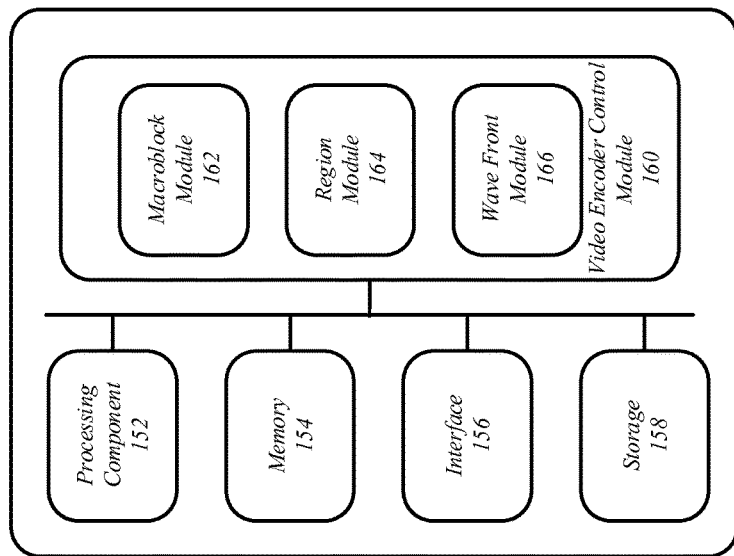
FIG. 1B illustrates an exemplary embodiment of a computing system.

FIG. 1B illustrates exemplary embodiment of a computing system 150 for processing information including one or more video frames. Computing system 150 may be representative of a system for processing information for and used in conjunction with the video frame processing system 100. For example, processing component 152 may process information and data for the video frame processing system 100 and memory 154 may be the same as or similar to memory 120. Further, the video encoder control module 160 may be used to control various aspects of encoding one or more frames for the video encoder 104. Computing system 150 may include a processing component 152, a memory 154, an interface 156 and storage 158. In addition, the computing system 150 may include a video encoder control module 160 having a macroblock module 162, a region module 164 and a wave front module 166. Although computing system 150 is illustrated with a limited number of components and modules, various embodiments are not limited in this manner and computing system 150 may have any number of component and modules to process information and data. For example, computing system 150 may include video decoder modules to decode the video frames in a similar manner as discussed below with respect to the video encoder control modules.

The processing component 152 may be one or more of any type of computational element, such as but not limited to, a microprocessor, a processor, central processing unit, digital signal processing unit, dual core processor, multi core processor, graphics processing unit (GPU), mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor, processing circuitry, or processing circuit on a single chip or integrated circuit. The processing component 152 may be connected to and communicate with the other elements of the computing system via an interconnect, such as one or more buses, control lines, and data lines.

In some embodiments, the processing component 152 may be a graphics processing unit (GPU). However, in the same or other embodiments, computer system 150 may include a standalone and separate GPU (not shown). The GPU may include any processing unit, logic or circuitry optimized to perform graphics-related operations as well as the video encoder and video decoder engines and the frame correlation engines. The GPU may be used to render 2-dimensional (2-D) and/or 3-dimensional (3-D) images for various applications such as video games, graphics, computer-aided design (CAD), simulation and visualization tools, imaging, etc. Various embodiments are not limited in this manner; the GPU may process any type of graphics data such as pictures, videos, programs, animation, 3D, 2D, and so forth.

In some embodiments, computing system 150 may include memory 154 to couple to processing component 152. Memory 154 may be coupled to processing component 152 via one or more interconnects, or by a dedicated communications bus between processing component 152 and memory 154, as desired for a given implementation. Memory 154 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 154 can store data momentarily, temporarily, or permanently. The memory 154 stores instructions and data for computing system 150. The memory 154 may also store temporary variables or other intermediate information, such as frame information, bitstream information, encoded information and so forth, while the processing component 152 is executing instructions. The memory 154 is not limited to storing the above discussed data; the memory 154 may store any type of data.

Computing system 150 may include one or more interfaces 156, in some embodiments. Examples of an interface 156 may include Universal Serial Bus (USB) ports/adapters, IEEE 1394 Firewire ports/adapters, and so forth. The embodiments are not limited in this context.

In various embodiments, one or more of the interfaces 156 may be a wired or wireless connection, such as a transceiver. More specifically, one or more interfaces 156 may include one or more radios capable of transmitting and receiving signals and information using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, interface 156 may operate in accordance with one or more applicable standards in any version. The embodiments are not limited in this context.

In various embodiments, the computing system 150 may include a video encoder control module 160 to control various aspects of processing information by the video encoder 104. More specifically, the video encoder control module 160 may divide one or more frames of a video stream into macroblocks, divide the frames along macroblock boundaries and group the macroblocks into wave front groups for processing and encoding in parallel.

The video encoder control module 160 may include a macroblock module 162 to divide a frame into one or more macroblocks. Each frame may include any number of pixels based on the size and resolution of the frame. For example, a frame may have a size of 1280×720 pixels and each macroblock may be a size of 16×16 pixel matrix. In this example, the frame may be 80 macroblocks wide and 45 macroblocks high.

Figure 4:
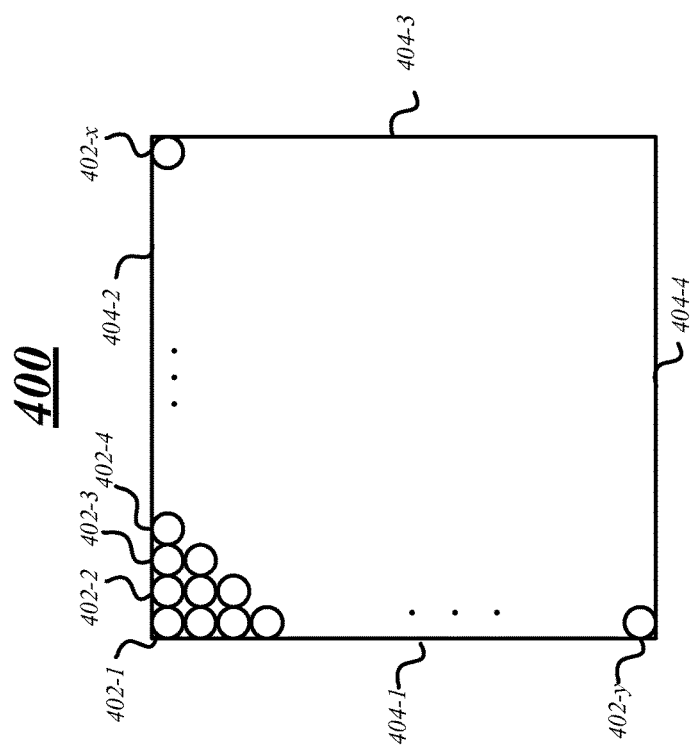
FIG. 4 illustrates an exemplary embodiment of a macroblock.

Each macroblock may have macroblock boundaries defined by the outer pixels of the macroblock, as discussed in more detail in FIG. 4. More specifically, a macroblock may have a left macroblock boundary or edge, a top macroblock boundary or edge, a right macroblock boundary or edge and a bottom macroblock boundary or edge. In some embodiments, the frame may additional be divided along one or more macroblock boundaries to create regions.

More specifically, the video encoder control module 160 may include a region module 164 to divide frames along the macroblock boundaries to generate one or more regions. The macroblocks may be assigned to one or more wave front groups by the wave front module 166 and each macroblock in a wave front group may be processed in parallel. Parallel processing advantages may be realized when frames are split into two or more regions. For example, by dividing the frame into regions the number of wave front groups may be reduced and more macroblocks may be processed in parallel.

In some embodiments, the region module 164 may divide frames horizontally along macroblock boundaries to divide the frame into two or more regions. As will be discussed below with respect to FIG. 2B, frames may be divided in half to create two regions. However, various embodiments not limited in this manner and frames may be divided horizontally to create any number of regions having macroblocks.

Figure 2B:
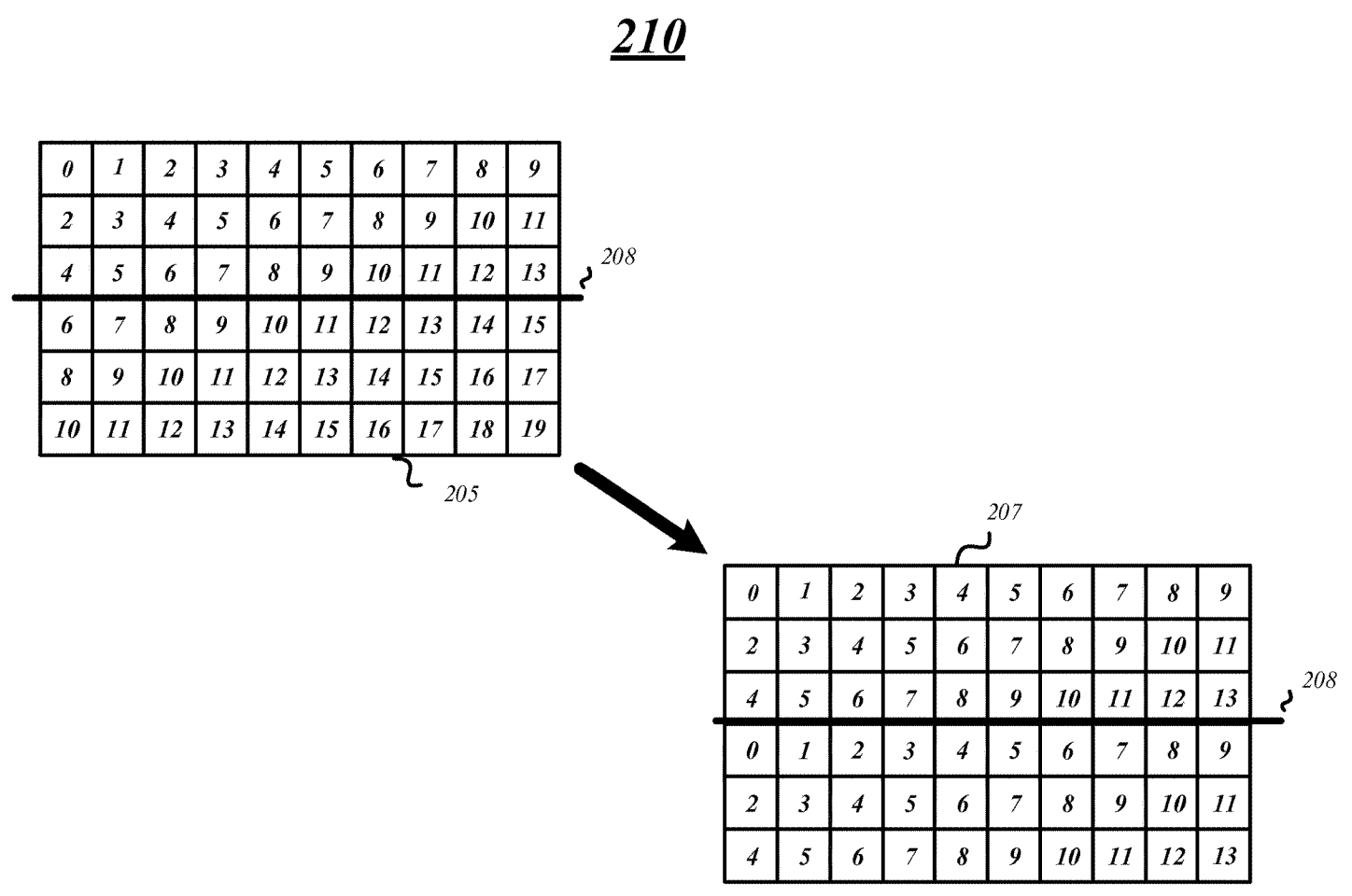
Figure 2D:
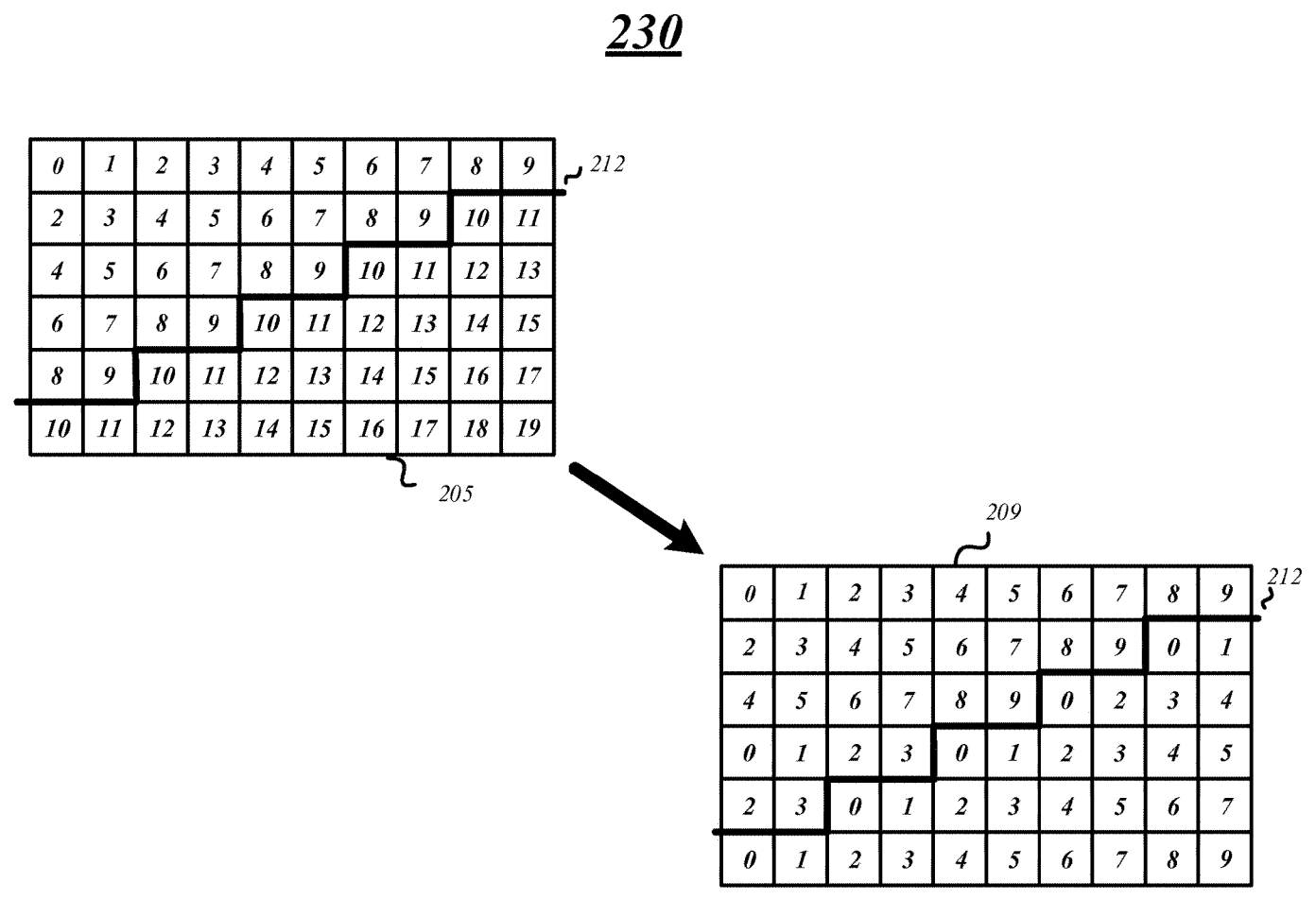

The region module 164 may also divide the frames diagonally along macroblock boundaries to create two or more regions, as illustrated in FIG. 2D. In some embodiments, the macroblock boundary divided along may be a wave front boundary determined prior to the frames being split into regions. More specifically, the frame may be divided along a previous wave front boundary to realize optimal macroblock parallel processing. Each wave front group may be generated by assigning one or more macroblocks to the group. In some embodiments, the assignment of the wave front groups may start from a beginning value after a macroblock boundary and/or wave front boundary. For example, as illustrated in FIG. 2D the assignment of the wave front groups restarts at 0 in each row after the wave front boundary. Various embodiments may not be limited in this manner and the assignment of wave front groups may occur in manner to optimize parallel processing.

In some embodiments, the region module 164 may divide the frames such that an equal number of macroblocks are in each region. However, in some instances the frames may not be divided evenly due to the size of the frames and/or the number of macroblocks in the frames. In these instances, each region may not have an equal number of macroblocks. For example, one region may have an extra macroblock in it to be processed. Various embodiments are not limited in this manner.

The video encoder control module 160 may also include a wave front module 166 to generate one or more wave front or wave front groups. Each wave front group may include one or more macroblocks for processing in parallel. In other words, each macroblock in the same wave front group may be processed at the same time or in parallel.

In various embodiments, the wave front module 166 may assign or generate the wave front groups based on macroblock dependencies. In some instances, a macroblock may require one or more of its neighboring macroblocks to be processed before it can be processed. For example, a macroblock may require that the macroblocks to the left, top and top-right of it be processed before it can be processed. In another example, a macroblock may require that the macroblocks to the left and on top of it are processed before it can be processed. Various embodiments are not limited in this manner and some frames may have macroblocks with no dependencies or more than three dependencies. Moreover, the macroblocks may be assigned to wave front groups in a staggered fashion to compensate for these macroblock dependencies. Usually the worst case macroblock dependencies are consistent throughout the frame. that means there may be multiple MBs that are not dependent on each other. Wave front groups are formed by identifying the macroblocks.

FIG. 2A illustrates an exemplary embodiment of a frame 205 divided into a number of macroblocks in macroblock columns 202 and macroblock rows 204. FIG. 2A illustrates a limited number of macroblocks for illustrative purposes only. However, various embodiments are not limited in this manner.

Each macroblock illustrated in FIG. 2A may be assigned to a wave front group. The wave front groups are illustrated by the number in each of the macroblocks. For example, the top left macroblock is in the wave front group 0 with the identifier 206-1, the macroblock in the wave front group 1 has identifier 206-2, the macroblocks in the wave front group 2 has the identifier 206-3 and the macroblocks in the wave front group 3 has the identifier 206-4. Each macroblock having the same number is in the same wave front group and is processed in parallel.

As previously discussed, the macroblocks may be assigned to the wave front groups.

As illustrated in FIG. 2A, the frame 205 has wave front groups 0-19 and a total number of 20 wave fronts may be processed for the frame 205 to be encoded. However, dividing the frames into a number of regions may reduce the number of wave front groups and wave front groups required to be processed for a frame to be encoded.

FIGS. 2B/2C illustrates exemplary embodiments of dividing the frame 205 into regions horizontally along macroblock boundaries shown by dividing line 208. Macroblocks in each region may be assigned to the wave front groups as previously discussed. However, in this exemplary embodiment, the wave front group assignments may be repeated as illustrated in frame 207. For example, both top left macroblocks in each region are assigned to the same wave front group of 0.

As illustrated in FIG. 2C, the wave front group assignments may be repeated because one or more rows of macroblocks are between rows having the same wave front group assignments. For example, in this illustrative embodiment two rows of macroblocks are between rows having the same wave front group assignment. By dividing the frame 207 into regions and assigning macroblocks to wave front groups in this manner, the number of wave fronts to be processed may be further reduced. In this exemplary embodiment, the number of wave front to be processed is reduced from 20 wave front groups to 14 wave front groups. Another reason to have a repeated wavefront group may be because the dependencies along the line 208 may be purposely removed. Accordingly, the bottom region looks like the top region and the top left macroblock in the bottom region may be processed together with the top left macroblock of the top region.

In particular, more macroblocks are assigned to the same wave front groups. For example, two macroblocks are assigned to the wave front group 0 having identifier 206-1, two macroblocks are assigned to the wave front group 1 having identifier 206-2, four macroblocks are assigned to the wave front group 2 having identifier 206-3, and four macroblocks are assigned to the wave front group 3 having identifier 206-4, and so on. Thus, the number of macroblocks that may be processed in parallel increases when the frame 207 is divided into two regions. By processing more macroblocks in parallel GPU processing cycles may be reduced and power may be saved along with battery power.

FIGS. 2D/2E illustrates an exemplary embodiment of a frame split into two regions diagonally along macroblock boundaries along a wave front boundary 212. The wave front boundary 212 may be the diagonal line dividing the frame at macroblocks belonging to the same wave front group prior to the video frame being divided into regions as illustrated in video frame 205 of FIG. 2D In various embodiments, a video frame may be divided diagonally from the bottom left corner of the video frame to the upper right corner of the video frame. For example, FIG. 2D illustrates the wave front boundary 212 along macroblocks belong to wave front group 9 from the bottom left corner to the upper right corner of video frame 209. Various embodiments are not limited in this manner, and video frames may be divided diagonally along any wave front boundary.

Figure 2E:
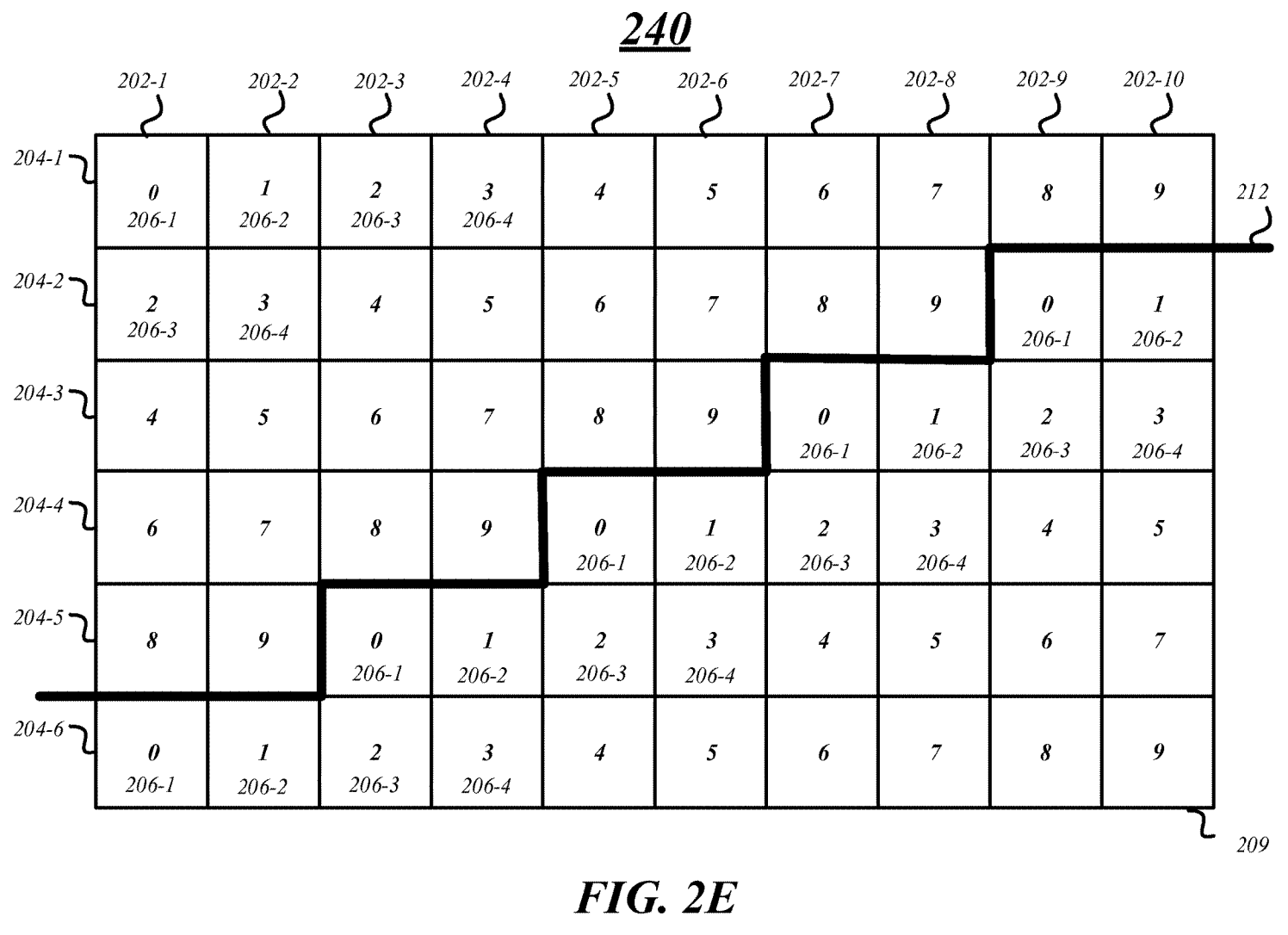

Additional advantages may be realized by dividing the video frame into regions diagonally along macroblock boundaries along a wave front boundary, as illustrated by video frames 209 of FIGS. 2D and 2E. Each wave front group may include one or more macroblocks that when the video frame is divided horizontally or not divided at all. FIG. 2E illustrates video frame 209 having ten wave front groups, 0-9. In this exemplary embodiment, additional macroblocks may be processed in parallel and additional processing cycles may be reduced. For example, six macroblocks are assigned to the wave front group 0 having identifier 206-1, six macroblocks are assigned to the wave front group 1 having identifier 206-2, six macroblocks are assigned to the wave front group 2 having identifier 206-3, and six macroblocks are assigned to the wave front group 3 having identifier 206-4.

However, dividing a frame diagonally along the wave front boundary may require that one or more of the macroblocks along the wave front boundary be processed based on predictions of neighboring macroblocks. In some embodiments, a predicted macroblock may be formed using default values for the motion vectors and modes. In some embodiments, a prediction for neighboring macroblocks may be formed during a video pre-processing phase where values for motion vectors and modes are determined. However, various embodiments may not be limited in this manner and a predication for macroblocks may be made by other means known to one skilled in the art.

In some embodiments, the frames maybe divided into regions such that an equal number of macroblocks in each of the regions. For example, the frame 207 illustrated in FIGS. 2B and 2C may be divided in half horizontally such that 30 macroblocks are in each region. Similarly, the video frame 209 illustrated in FIGS. 2D and 2E may be divided diagonally and each of the regions may also have 30 macroblocks. In some embodiments, the frames may not be divided evenly and the same number of macroblocks is not in each region. One or more of the regions may include one or more additional macroblocks.

FIG. 3A illustrates an exemplary embodiment video frame 205 having a macroblock and a macroblock dependency 302-1. In this exemplary embodiment, the video frame 205 is not divided into regions and may be the same as or similar to the video frame 205 illustrated in FIG. 2A. FIG. 3A illustrates the macroblock located at column 202-1 and row 204-2 having a macroblock dependency 302-1 on the neighboring macroblocks to the left, top and top-right as illustrated with the arrows. Therefore, for the macroblock at this location to be processed, the macroblocks in which it depends from must be processed.

In this exemplary embodiment, the macroblocks are assigned to wave front groups such that the neighboring macroblocks are processed prior to the dependent macroblock is processed. For example, as illustrated in FIG. 3A the macroblock having the macroblock dependency is in wave front group 3, while its neighboring macroblocks are in wave front groups 1 and 2. The macroblocks in wave front groups 1 and 2 may be processed prior to the encoding of the macroblocks in wave front group 3.

As previously discussed above with respect to FIG. 2A, when a video frame is not divided into regions additional wave front groups may be required to process the frame. The number of wave fronts may be reduced by dividing the video frame into regions either horizontal, diagonally, or some other means. However, dividing the video frame into regions may require that some of the dependent macroblocks are processed using default values for the video motion and mode computations.

Figure 3B:
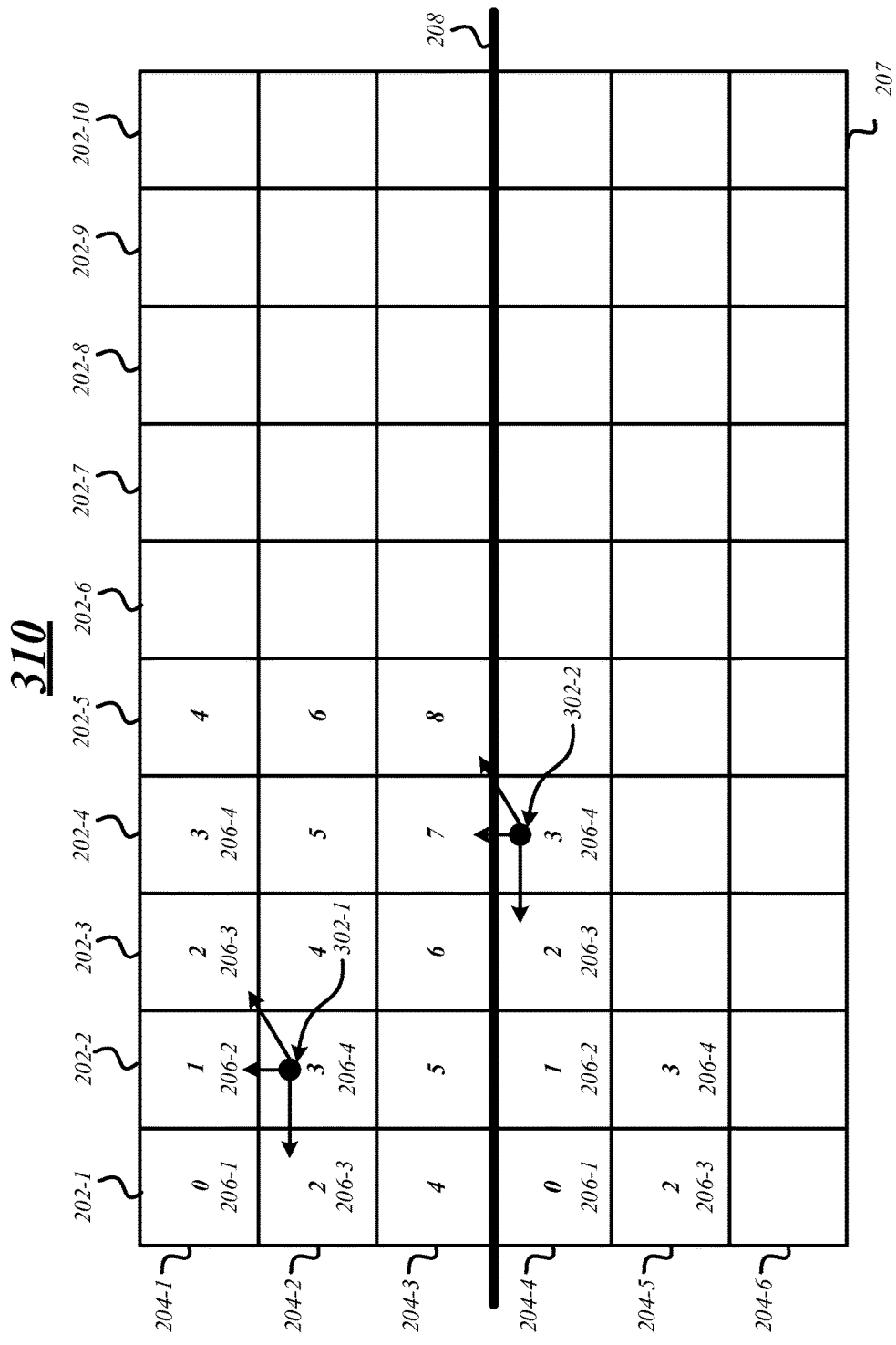

FIG. 3B illustrates an exemplary embodiment of a frame 207 divided into regions horizontally having macroblocks and macroblock dependencies 302-1 and 302-2. In this exemplary embodiment, one or more of the macroblocks in the bottom region may be processed using predicted or default values for one or more of its parent macroblocks. For example, the macroblock at column 202-4 and row 204-4 is in wave front group 3. However, this macroblock has dependencies on macroblocks in wave front groups 2, 7 and 8 as illustrated by the arrows of macroblock dependency 302-2. When processed in ascending order, macroblocks in wave front group 3 will be processed before the macroblocks in wave front groups 7 and 8. Therefore, predicted values for the parent macroblocks in wave front groups 7 and 8 may be required when the macroblock at this location. The predicted values may be default values or other predictions must be used. Further, as illustrated in FIG. 3B other macroblocks along the macroblock boundary dividing the frame 207 into two regions may also be required to use some default values or other predicted values when they are processed. In addition, frames divided diagonally along a wave front boundary may also have macroblocks that may use some default values or other predicted values when being processed.

Figure 3C:
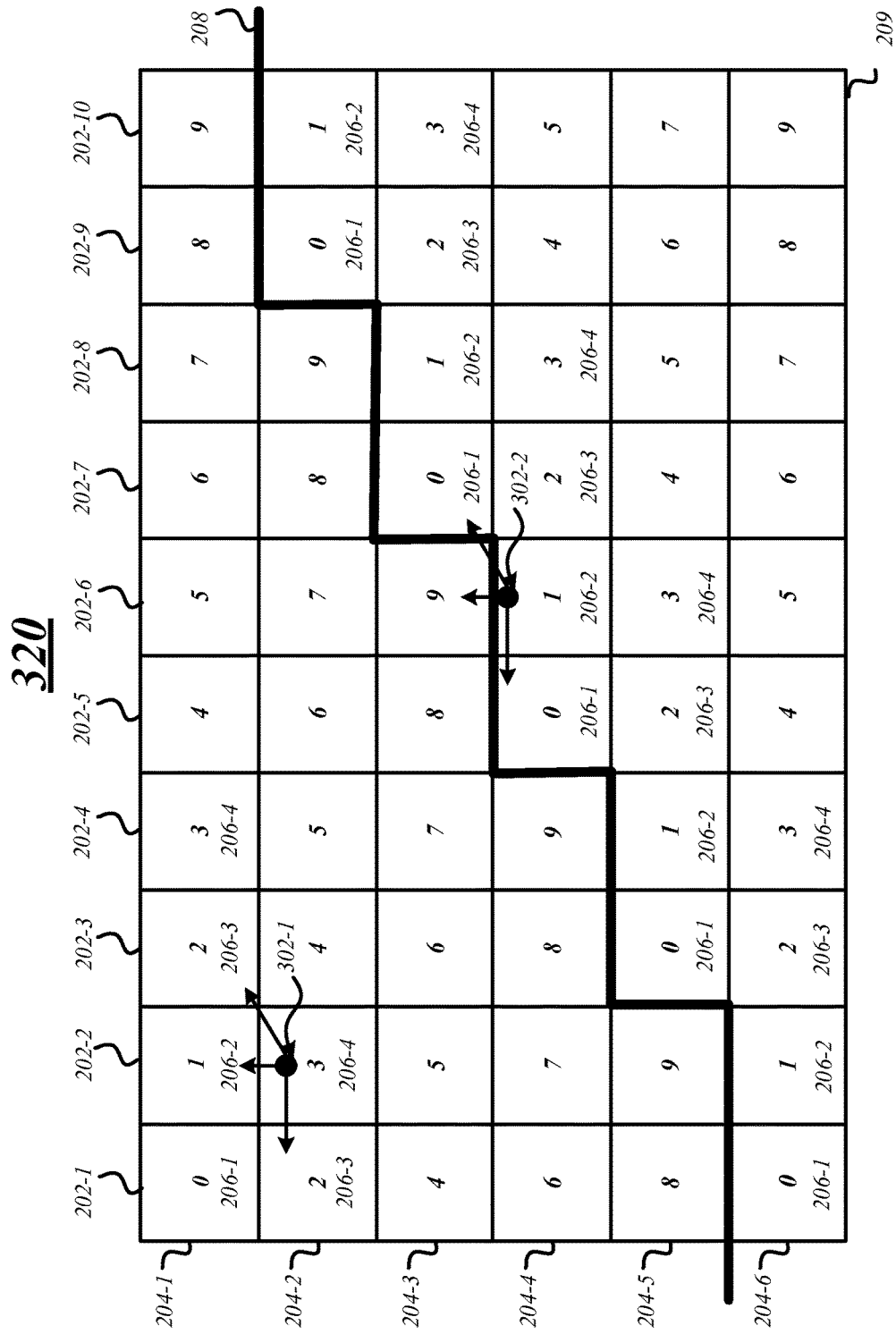

FIG. 3C illustrates an exemplary embodiment of a frame 209 divided diagonally into two regions along a wave front boundary. As similarly discussed above, one or more of the macroblocks in the bottom region may be processed using some default values or other predicted values for one or more of its parent macroblocks. For example, the macroblock at column 202-6 and row 204-4 is in wave front group 1. However, this macroblock has dependencies on macroblocks in wave front groups 0 and 9 as illustrated by the arrows of macroblock dependency identifier 302-2. When processed in ascending order, macroblocks in wave front group 1 will be processed before the macroblocks in wave front group 9. Therefore, default values or predicted values for the parent macroblocks in wave front groups 9 may be used when the macroblock at this location is processed. Further, as illustrated in FIG. 3C other macroblocks along the macroblock or wave front boundary dividing the video frame 209 into two regions may also be required to use some default values or other predicted values when they are processed.

FIG. 3D illustrates an exemplary table 350 showing a number of wave front groups required to process a video frame based on the number of regions, the frame size, and the method used to divide frame into regions (horizontal or diagonal). As clearly illustrated in the table 350, dividing a video frame into regions diagonally has a significant advantage over dividing the video frame horizontal in the reduction in the number of wave front groups for processing. In addition, dividing the frame into more than two regions also reduces the number of wave front groups for processing in both cases, e.g. horizontal and diagonal division.

In one example illustrated in table 350, a frame having a size of 1280×720 divided into two regions requires 124 wave front groups when divided horizontally and requires 84 wave front groups when divided diagonally along a wave front boundary. In another example, a frame having the same size divided into eight regions requires 90 wave front groups when divided horizontally and requires 21 wave front groups when divided diagonally. As can be seen by these examples, the number of wave front groups required to process a frame can be significantly reduced by increasing the number of regions and diagonally dividing the frame.

In various embodiments, the number of wave front groups required may be calculated for both dividing horizontally and diagonally. Equation 1 may be used to calculate the number of wave front groups required to encode a video frame when divided horizontally into regions for macroblocks having left, top and top-right dependencies.

$$\text{wave front groups} = W + 2 \ast ((H + (N-1))/N - 1), \quad 1.$$

where
W=frame width in macroblocks;
H=frame height in macroblocks; and
N=number of regions.

Equation 2 may be used to calculate the number of wave front groups required to encode a video frame when divided diagonally into regions for macroblocks having left, top and top-right dependencies.

$$\text{wave front groups} = (W + 2 \ast (H-1) + (N-1))/N, \quad 2.$$

where
W=frame width in macroblocks;
H=frame height in macroblocks; and
N=number of regions.

In some embodiments, macroblocks may only have left and top dependencies (not shown). Equation 3 may be used to calculate the number of wave front groups required to encode a video frame when divided horizontally into regions for macroblocks having left and top dependencies.

$$\text{wave front groups} = W + ((H + (N-1))/N - 1), \quad 3.$$

where
W=frame width in macroblocks;
H=frame height in macroblocks; and
N=number of regions.

Equation 4 may be used to calculate the number of wave front groups required to encode a video frame when divided diagonally into regions for macroblocks having left and top dependencies.

$$\text{wave front groups} = (W + (H-1) + (N-1))/N, \quad 4.$$

where
W=frame width in macroblocks;
H=frame height in macroblocks; and
N=number of regions.

Equations 1-4 may be used to determine a number of wave front groups for any size display having any number of macroblocks. For a multi-core, multi-threaded, or on any parallel processing component each macroblock may be processed in parallel or approximately at the same time. Thus, the time it takes to process a wave front group is constant regardless of the size of the wave front group. For example, equation 5 may be used to calculate the amount of time to process a frame.

$$\text{processing time} = WFG \ast WT, \quad 5.$$

where
WFG=the number of wave front groups; and
WT=the time to process one wave front group.

Therefore, as illustrated by equation 5, process time may be reduced when the number of wave front groups is reduced. In addition, power consumption may be reduced as processing time is reduced extending the battery life of computing devices operating on battery power. Further, each of the regions may contain an equal number of wave fronts hence the performance of the computing system may be improved by a factor of N or the number of regions. In some cases, the processing time of a wave front group may depend on it size. In such cases, the number of wave front groups in each region can be adjusted so that all the processing of regions can be completed at the same or approximately the same time to achieve the maximum parallelism and scalability. For example, one region might have more macroblocks than another region. In some instances processing the first region may take longer time to complete than the second region. In this case, the wavefront boundary may be moved from first region to the second region so that the processing load can be balanced. These and other advantages may be realized by dividing video frames into any number of regions horizontally or diagonally.

FIG. 4 illustrates an exemplary embodiment of a macroblock 400. In various embodiments, macroblock 400 may be a processing unit in image and video compression formats based on linear block transforms, such as the discrete cosine transform (DCT). A macroblock typically consists of 16×16 sample of pixels 402, and is further subdivided into transform blocks, and into prediction blocks. Various image and video compression formats that may be based on macroblocks include Joint Photographic Experts Group (JPEG), where they are called minimum coded unit (MCU) blocks, H.261, Moving Pictures Expert Group (MPEG)-1 Part 2, H.262/MPEG-2 Part 2, H.263, MPEG-4 Part 2, H.264/MPEG-4 AVC, and so forth.

In various embodiments, each macroblock 400 may include macroblock boundaries. More specifically, each macroblock 400 may have a left side 404-1, a top side 404-2, a right side 404-3 and a bottom side 404-4. Each side may define a macroblock boundary for macroblock 400. Further, each side may be defined by a row or column of pixels 402. For example, the top side 404-2 may be defined by a row of pixels 402. As previously discussed, a macroblock 400 may be a 16×16 matrix of pixels and thus each side may have a length of 16 pixels. However, various embodiments are not limited in this manner and the macroblock may be any size.

Figure 5:
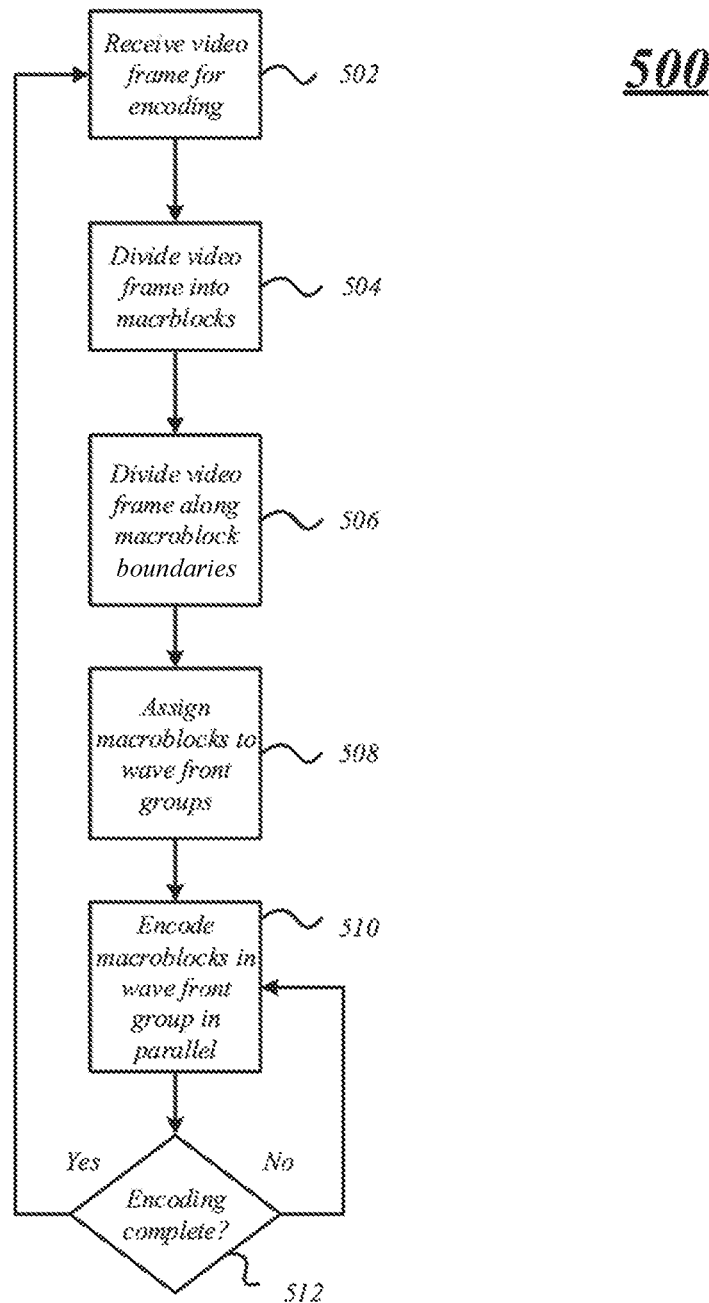
FIG. 5 illustrates an exemplary embodiment of a first logic flow diagram.

FIG. 5 illustrates an exemplary embodiment of a first logic flow 500 diagram for processing one or more video frames. For clarity purposes, the logic flow 500 is discussed with reference to system 100 and system 150 of FIGS. 1A and 1B. In various embodiments, a frame may be received for encoding at block 502. More specifically, a video encoder 104 may receive one or more frames in a video stream from a frame source 102 for encoding according to one or more embodiments described herein. At block 504, the frame may be divided into macroblocks, such as macroblock 400. In some embodiments, the macroblock module 162 may send information or data to the video encoder 104 to divide each frame into a 16×16 pixel macroblock for further processing. Each frame may be divided into a number of macroblocks based on the frame size. For example, a frame having a frame size of 1280×720 pixels may be divided into 125 macroblocks in an 80×45 macroblock matrix based on a macroblock size of 16×16.

In some embodiments, the frame may also be divided into regions along macroblock boundaries or wave front boundaries at block 506. For example, the region module 164 of FIG. 1B may send information to the video encoder 104 to divide a frame horizontally or diagonally along a macroblock boundary and in some instances a wave front boundary. A wave front boundary may be the diagonal line dividing the frame at macroblocks, as illustrated in FIG. 2D. In various embodiments, a frame may be divided diagonally from the bottom left corner of the frame to the upper right corner of the frame.

The frame may be divided along the macroblock boundaries to create any number of regions. For example, when the frame is divided diagonally along the wave front boundary from the bottom left corner of the frame to the top right corner of the frame two regions may be created, a top region and a bottom region. Various embodiments are not limited to dividing the frame into two regions and the frame may be divided into any number of regions.

At block 508, each macroblock may be assigned to a wave front group. In some embodiments, the wave front module 166 may send information to the video encoder 104 to assign the macroblocks such that macroblock dependencies are met. Each wave front group may be generated by assigning one or more macroblocks to the group. In some embodiments, the assignment of the wave front groups may start from a beginning value after a macroblock boundary and/or wave front boundary. For example, as illustrated in FIG. 2D the assignment of the wave front groups restarts at 0 in each row after the wave front boundary. Various embodiments may not be limited in this manner and the assignment of wave front groups may occur in manner to optimize parallel processing.

In various embodiments, macroblocks in the same wave front group may be processed in parallel at block 510. Moreover, the video encoder 104 may process all the macroblocks in the same wave front group simultaneously and each wave front group may be processed in ascending order based on their assignments to ensure that macroblock dependencies are met and to limit the number of macroblocks encoded based on predicted values. Once all the macroblocks are initially processed a second phase of encoding may be conducted. In the second phase, all the motion vector and mode decisions generated in the first phase are processed and those values are used to encode the entire frame and to generate the final bit stream. At decision block 512, the video encoder 104 may determine if all of the macroblocks in the video frame are encoded. If encoding of the frame is complete, blocks 502 through 512 may be repeated until all of the frames are encoded for a video stream.

FIG. 6 illustrates an embodiment of a second logic flow 600. The logic flow 600 may be representative of some or all of the operations executed by one or more embodiments described herein. For example, the logic flow 600 may illustrate operations performed by the system 100 and system 150.

In the illustrated embodiment shown in FIG. 6, the logic flow 600 may include dividing a video frame including pixels into a number of macroblocks, each macroblock including a number of pixels within four macroblock boundaries at block 605. In some embodiments, each macroblock may include 256 pixels in a 16×16 matrix of pixels and include values for presenting information on a display device. The frame may be divided into any number of macroblocks based on the frame size and the number of pixels with the frame. Further, various embodiments are not limited to macroblocks having a size of 16×16 and the macroblocks may be any size.

The four macroblock boundaries may include a left boundary or edge, a top boundary or edge, a right boundary or edge and a bottom boundary or edge. The macroblocks boundaries may be defined by the outer pixels of the macroblock.

At block 610, logic flow 600 may also include creating at least two regions having a plurality of macroblocks by dividing the video frame along macroblock boundaries. More specifically, the frame may be divided horizontally or diagonally one or more times to create two or more regions each having a number of macroblocks. In some embodiments, the regions may be generated such that there an equal number of macroblocks in each region to ensure that parallel processing of the wave front groups in each region finishes at approximately the same time. However, some video frames may not be able to be divided evenly such that each region has an equal number of macroblocks. In these instances one or more of the regions include one or more extra macroblocks.

The logic flow 600 at block 615 may also include generating wave front groups based on the macroblocks in each region, each wave front group comprising one or more macroblocks to process in parallel. The wave front groups may be generated by assigning one or more macroblocks to each of the wave front groups. In some embodiments, the macroblocks may be assigned to each wave front group such that an equal number of macroblocks are each wave front group. Further, the macroblocks may be assigned to the wave front groups based on each macroblock's location within the frame. Each macroblock may have macroblock dependencies and neighboring macroblocks may need to be processed before the dependent macroblock is processed. As such, the macroblocks may be assigned or allocated to the wave front groups such that the macroblock dependencies are satisfied for the macroblocks ensuring that parent macroblocks are processed before dependent macroblocks or default values or other predictions may be required.

Figure 7:
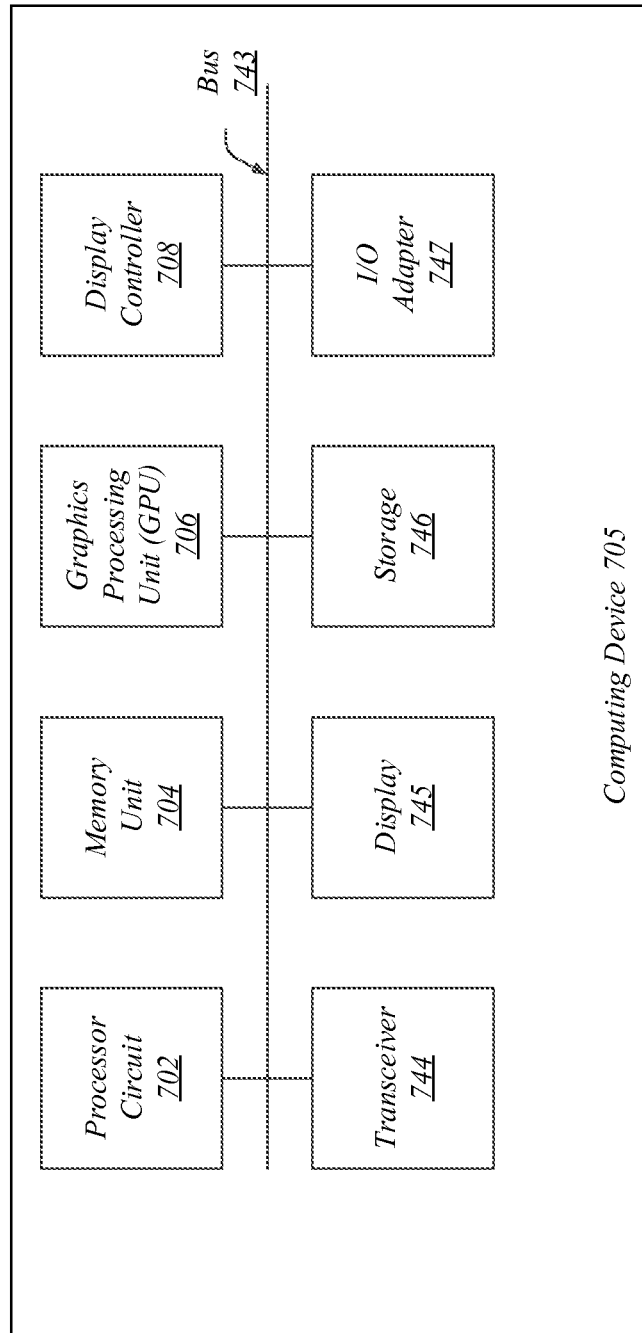
FIG. 7 illustrates an exemplary embodiment of a computing system.

FIG. 7 illustrates one embodiment of a system 700. In various embodiments, system 700 may be representative of a system or architecture suitable for use with one or more embodiments described herein, such as systems 100 and 150 of FIGS. 1A and 1B. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In various embodiments, system 700 may include a computing device 705 which may be any type of computer or processing device including a personal computer, desktop computer, tablet computer, netbook computer, notebook computer, laptop computer, server, server farm, blade server, or any other type of server, and so forth.

Examples of a computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

In various embodiments, computing device 705 may include processor circuit 702. Processor circuit 702 may be implemented using any processor or logic device. The processing circuit 702 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 702 may be connected to and communicate with the other elements of the computing system via an interconnect 743, such as one or more buses, control lines, and data lines.

In one embodiment, computing device 705 may include a memory unit 704 to couple to processor circuit 702. Memory unit 704 may be coupled to processor circuit 702 via communications bus 743, or by a dedicated communications bus between processor circuit 702 and memory unit 704, as desired for a given implementation. Memory unit 04 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 705 may include a graphics processing unit (GPU) 706, in various embodiments. The GPU 706 may include any processing unit, logic or circuitry optimized to perform graphics-related operations as well as the video decoder engines and the frame correlation engines. The GPU 706 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 706 may process any type of graphics data such as pictures, videos, programs, animation, 3D, 2D, objects images and so forth.

In some embodiments, computing device 705 may include a display controller 708. Display controller 708 may be any type of processor, controller, circuit, logic, and so forth for processing graphics information and displaying the graphics information. The display controller 708 may receive or retrieve graphics information from one or more buffers, such as buffer(s) 220. After processing the information, the display controller 708 may send the graphics information to a display.

In various embodiments, system 700 may include a transceiver 744. Transceiver 744 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 744 may operate in accordance with one or more applicable standards in any version. The embodiments are not limited in this context.

In various embodiments, computing device 705 may include a display 745. Display 745 may constitute any display device capable of displaying information received from processor circuit 702, graphics processing unit 706 and display controller 708.

In various embodiments, computing device 705 may include storage 746. Storage 746 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may include technology to increase the storage performance enhanced protection for valuable digital media when multiple hard drives are included, for example. Further examples of storage 746 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 705 may include one or more I/O adapters 747. Examples of I/O adapters 747 may include Universal Serial Bus (USB) ports/adapters, IEEE 1394 Firewire ports/adapters, and so forth. The embodiments are not limited in this context.

Figure 8:
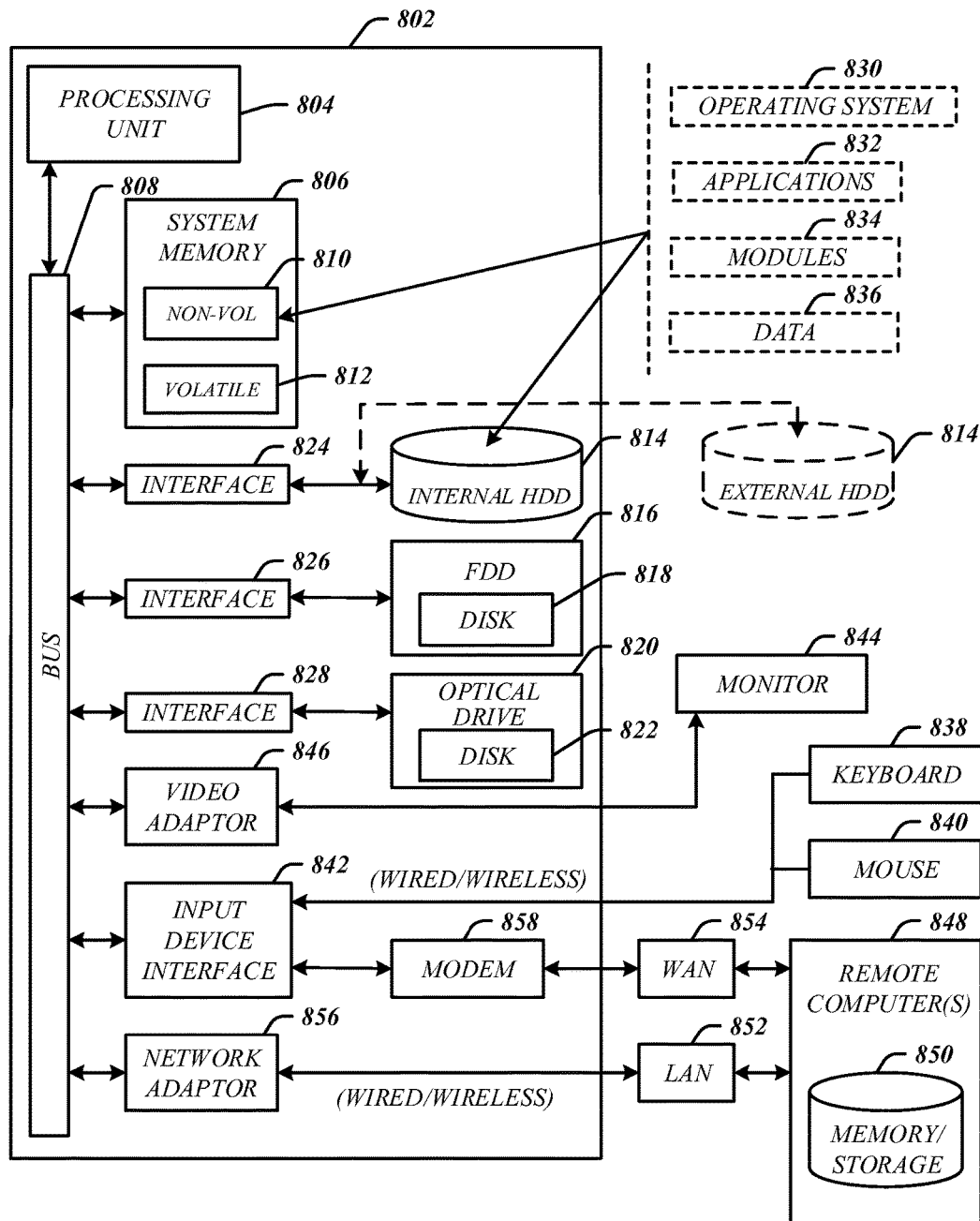
FIG. 8 illustrates an exemplary embodiment of a computing architecture.

FIG. 8 illustrates an embodiment of an exemplary computing architecture 800 suitable for implementing various embodiments as previously described. In one embodiment, the computing architecture 800 may include or be implemented as part of systems 100 and 150.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 700.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the systems 100 and 150 as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-three (1-33) provided below are intended to be exemplary and non-limiting.

In a first example, a system or an apparatus having processing circuitry, a macroblock module for execution on the processing circuitry to divide a video frame comprising pixels into a number of macroblocks, each macroblock comprising a number of pixels within multiple macroblock boundaries, a region module for execution on the processing circuitry to create at least two regions having a plurality of macroblocks by dividing the video frame along macroblock boundaries and a wave front module for execution on the processing circuitry to generate wave front groups based on the macroblocks in each region, each wave front group comprising one or more macroblocks to process in parallel.

In a second example and in furtherance of the first example, an apparatus may include a region module to create the at least two regions comprising dividing the video frame diagonally along the macroblock boundaries.

In a third example and in furtherance of any of the previous examples, an apparatus may include a region module to divide the video frame diagonally from a bottom left corner of the video frame to a top right corner of the video frame.

In a fourth example and in furtherance of any of the previous examples, an apparatus may include a region module to create the at least two regions comprising dividing the video frame such that each region has an equal number of macroblocks to maximize parallel processing of the macroblocks.

In a fifth example and in furtherance of any of the previous examples, an apparatus may include a wave front module to generate the wave front groups comprising assigning each macroblock to a particular wave front group and an extra macroblock to at least one of the wave front groups when an equal number of macroblocks cannot be assigned to the wave front groups.

In a sixth example and in furtherance of any of the previous examples, an apparatus may include a wave front module to generate the wave front groups comprising assigning each macroblock to a wave front group based on macroblock dependencies.

In a seventh example and in furtherance of any of the previous examples, an apparatus may include processing circuitry to process each macroblock in a wave front group in parallel.

In an eighth example and in furtherance of any of the previous examples, an apparatus may include processing circuitry to process each wave front group in an order based on macroblock dependencies where macroblocks in a wave front group depend on processing results of macroblocks in another wave front group.

In a ninth example and in furtherance of any of the previous examples, an apparatus may include macroblocks comprising a 16×16 matrix of pixels.

In a tenth example and in furtherance of any of the previous examples, an article comprising a computer-readable storage medium comprising a plurality of instructions that when executed enable processing circuitry to divide a video frame comprising pixels into a number of macroblocks, each macroblock comprising a number of pixels within multiple macroblock boundaries, create at least two regions having a plurality of macroblocks by dividing the video frame along macroblock boundaries and generate wave front groups based on the macroblocks in each region, each wave front group comprising one or more macroblocks to process in parallel.

In an eleventh example and in furtherance of any of the previous examples, a storage medium comprising instructions that when executed enable processing circuitry to create at least two regions comprising dividing the video frame diagonally along the macroblock boundaries.

In a twelfth example and in furtherance of any of the previous examples, a storage medium comprising instructions that when executed enable processing circuitry to divide the video frame diagonally comprising dividing the video frame from a bottom left corner of the video frame to a top right corner of the video frame.

In a thirteenth example and in furtherance of any of the previous examples, a storage medium comprising instructions that when executed enable processing circuitry to create at least two regions comprising dividing the video frame such that each region has an equal number of macroblocks to maximum parallel processing of the macroblocks.

In a fourteenth example and in furtherance of any of the previous examples, a storage medium comprising instructions that when executed enable processing circuitry to generate wave front groups comprising assigning each macroblock to a particular wave front group and an extra macroblock to at least one of the wave front groups when an equal number of macroblocks cannot be assigned to the wave front groups.

In a fifteenth example and in furtherance of any of the previous examples, a storage medium comprising instructions that when executed enable processing circuitry to generate wave front groups comprising assigning each macroblock to a wave front group based on macroblock dependencies.

In a sixteenth example and in furtherance of any of the previous examples, a storage medium comprising instructions that when executed enable processing circuitry to process each macroblock in a wave front group in parallel.

In a seventeenth example and in furtherance of any of the previous examples, a storage medium comprising instructions that when executed enable processing circuitry to process each wave front group in an order based on macroblock dependencies where macroblocks in a wave front group depend on processing results of macroblocks in another wave front group.

In a eighteenth example and in furtherance of any of the previous examples, a method may include dividing, by a processing component, a frame comprising pixels into a number of macroblocks, each macroblock comprising a number of pixels within multiple macroblock boundaries, creating at least two regions having a plurality of macroblocks by dividing the frame along macroblock boundaries and generating wave front groups based on the macroblocks in each region, each wave front group comprising one or more macroblocks to process in parallel.

In a nineteenth example and in furtherance of any of the previous examples, a method may include creating at least two regions comprising dividing the frame diagonally along the macroblock boundaries.

In a twentieth example and in furtherance of any of the previous examples, a method may include dividing the frame comprising dividing the frame diagonally from a bottom left corner of the video frame to a top right corner of the video frame.

In a twenty-first example and in furtherance of any of the previous examples, a method may include creating at least two regions comprising dividing the frame such that each region has an equal number of macroblocks to maximum parallel processing of the macroblocks.

In a twenty-second example and in furtherance of any of the previous examples, a method may include generating wave front groups comprising assigning each macroblock to a particular wave front group and an extra macroblock to at least one of the wave front groups when an equal number of macroblocks cannot be assigned to the wave front groups.

In a twenty-third example and in furtherance of any of the previous examples, a method may include generating wave front groups comprising assigning each macroblock to a wave front group based on macroblock dependencies.

In a twenty-fourth example and in furtherance of any of the previous examples, a method may include processing each macroblock in a wave front group in parallel.

In a twenty-fifth example and in furtherance of any of the previous examples, a method may include processing each wave front group in an order based on macroblock dependencies where macroblocks in a wave front group depend on processing results of macroblocks in another wave front group.

In a twenty-sixth example and in furtherance of any of the previous examples, an apparatus may include means for dividing a frame comprising pixels into a number of macroblocks, each macroblock comprising a number of pixels within multiple macroblock boundaries, means for creating at least two regions having a plurality of macroblocks by dividing the frame along macroblock boundaries and means for generating wave front groups based on the macroblocks in each region, each wave front group comprising one or more macroblocks to process in parallel.

In a twenty-seventh example and in furtherance of any of the previous examples, an apparatus may include means for creating at least two regions comprising means for dividing the frame diagonally along the macroblock boundaries.

In a twenty-eighth example and in furtherance of any of the previous examples, an apparatus may include means for dividing the frame comprising means for dividing the frame diagonally from a bottom left corner of the video frame to a top right corner of the video frame.

In a twenty-ninth example and in furtherance of any of the previous examples, an apparatus may include means for creating at least two regions comprising means for dividing the frame such that each region has an equal number of macroblocks to maximum parallel processing of the macroblocks.

In a thirtieth example and in furtherance of any of the previous examples, an apparatus may include means for generating wave front groups comprising means for assigning each macroblock to a particular wave front group and an extra macroblock to at least one of the wave front groups when an equal number of macroblocks cannot be assigned to the wave front groups.

In a thirty-first example and in furtherance of any of the previous examples, an apparatus may include means for generating wave front groups comprising means for assigning each macroblock to a wave front group based on macroblock dependencies.

In a thirty-second example and in furtherance of any of the previous examples, an apparatus may include means for processing each macroblock in a wave front group in parallel.

In a thirty-third example and in furtherance of any of the previous examples, an apparatus may include means for processing each wave front group in an order based on macroblock dependencies where macroblocks in a wave front group depend on processing results of macroblocks in another wave front group.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected"

along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   processing circuitry;
   a macroblock module for execution on the processing circuitry to divide a video frame comprising pixels into a number of macroblocks, each macroblock comprising a number of pixels within multiple macroblock boundaries;
   a region module for execution on the processing circuitry to create at least two regions having a plurality of macroblocks by dividing the video frame diagonally along a wave front boundary; and
   a wave front module for execution on the processing circuitry to generate wave front groups comprising one or more macroblocks to process in parallel, the wave front module to generate the wave front groups comprising assigning each macroblock to a wave front group starting at a beginning value after the wave front boundary.

2. The apparatus of claim 1, the region module to divide the video frame diagonally from a bottom left corner of the video frame to a top right corner of the video frame.

3. The apparatus of claim 1, the region module to create the at least two regions comprising dividing the video frame such that each region has an equal number of macroblocks to maximize parallel processing of the macroblocks.

4. The apparatus of claim 1, the processing circuitry to process each macroblock in a wave front group in parallel.

5. The apparatus of claim 1, the processing circuitry to process each wave front group in an order based on macroblock dependencies where macroblocks in a wave front group depend on processing results of macroblocks in another wave front group.

6. The apparatus of claim 1, wherein each macroblock comprising a 16×16 matrix of pixels.

7. The apparatus of claim 1, the wave front boundary comprising a diagonal line dividing the video frame at a set of macroblocks of the plurality of macroblocks belonging to a same wave front group prior to the video frame being divided into the at least two regions.

8. An article comprising a non-transitory computer-readable storage medium comprising a plurality of instructions that when executed enable processing circuitry to:
   divide a video frame comprising pixels into a number of macroblocks, each macroblock comprising a number of pixels within multiple macroblock boundaries;
   create at least two regions having a plurality of macroblocks by dividing the video frame diagonally along a wave front boundary;
   generate wave front groups comprising one or more macroblocks to process in parallel; and
   assign each macroblock to a wave front group starting at a beginning value after the wave front boundary.

9. The storage medium of claim 8, the dividing the video frame diagonally comprising dividing the video frame from a bottom left corner of the video frame to a top right corner of the video frame.

10. The storage medium of claim 8, comprising instructions that when executed enable the processing circuitry to create at least two regions comprising dividing the video frame such that each region has an equal number of macroblocks to maximize parallel processing of the macroblocks.

11. The storage medium of claim 8, comprising instructions that when executed enable the processing circuitry to process each macroblock in a wave front group in parallel.

12. The storage medium of claim 8, comprising instructions that when executed enable the processing circuitry to process each wave front group in an order based on macroblock dependencies where macroblocks in a wave front group depend on processing results of macroblocks in another wave front group.

13. The storage medium of claim 8, the wave front boundary comprising a diagonal line dividing the video frame at a set of macroblocks of the plurality of macroblocks belonging to a same wave front group prior to the video frame being divided into the at least two regions.

14. A computer-implemented method, comprising:
   dividing, by a processing component, a frame comprising pixels into a number of macroblocks, each macroblock comprising a number of pixels within multiple macroblock boundaries;
   creating, by the processing component, at least two regions having a plurality of macroblocks by dividing the frame diagonally along a wave front boundary; and
   generating, by the processing component, wave front groups comprising one or more macroblocks to process in parallel;
   and
   assigning each macroblock to a wave front group starting at a beginning value after the wave front boundary.

15. The computer-implemented method of claim 14, the dividing the frame comprising dividing the frame diagonally from a bottom left corner of the frame to a top right corner of the frame.

16. The computer-implemented method of claim 14, the creating at least two regions comprising dividing the frame such that each region has an equal number of macroblocks to maximize parallel processing of the macroblocks.

17. The computer-implemented method of claim 14, comprising:
   processing each macroblock in a wave front group in parallel.

18. The computer-implemented method of claim 14, comprising:
   processing each wave front group in an order based on macroblock dependencies where macroblocks in a wave front group depend on processing results of macroblocks in another wave front group.

19. The computer-implemented method of claim 14, the wave front boundary comprising a diagonal line dividing the frame at a set of macroblocks of the plurality of macroblocks belonging to a same wave front group prior to the frame being divided into the at least two regions.

* * * * *